US012243114B2

(12) United States Patent
Paranjape et al.

(10) Patent No.: US 12,243,114 B2
(45) **Date of Patent: *Mar. 4, 2025**

(54) OILFIELD DATA LOADING SERVICES REQUEST HANDLING AND COMPLETION SYSTEM

(71) Applicant: Schlumberger Technology Corporation, Sugar Land, TX (US)

(72) Inventors: Vishvesh Paranjape, Pune (IN); Vishakha Vijay Bhoite, Pune (IN); Jeremy Campbell, Harrogate (GB); Sayani Kumar, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,017

(22) Filed: Feb. 29, 2024

(65) Prior Publication Data

US 2024/0202845 A1 Jun. 20, 2024

Related U.S. Application Data

(63) Continuation of application No. 16/948,086, filed on Sep. 2, 2020, now Pat. No. 11,922,522.

(60) Provisional application No. 62/899,106, filed on Sep. 11, 2019.

(51) Int. Cl.
*G06Q 50/06* (2024.01)
*E21B 43/00* (2006.01)
*G06Q 10/0631* (2023.01)

(52) U.S. Cl.
CPC ............. *G06Q 50/06* (2013.01); *E21B 43/00* (2013.01); *G06Q 10/063114* (2013.01); *G06Q 10/06313* (2013.01)

(58) Field of Classification Search
None
See application file for complete search history.

(56) References Cited

U.S. PATENT DOCUMENTS 6,389,426 B1 * 5/2002 Turnbull ................ G06Q 10/10 709/224
7,669,133 B2 * 2/2010 Chikirivao ............. G06N 5/022 706/45
8,818,833 B2 * 8/2014 Druyan ............ G06Q 10/06315 719/318
2008/0208475 A1 * 8/2008 Karr ........................ G06F 16/26 702/6
2012/0005333 A1 * 1/2012 Beattie, Jr. .......... H04L 41/5074 709/224

(Continued)

*Primary Examiner* — Ryan D. Coyer
(74) *Attorney, Agent, or Firm* — Jeffrey D. Frantz

(57) ABSTRACT

A method for tracking, managing, and fulfilling data loading service request includes: receiving a data loading service request for loading oilfield-related data to an application; generating a service ticket based on the request, the service ticket identifying details of the data loading service request; assigning one or more tasks associated with the service ticket to one or more resources; receiving, from the one or more resources, information regarding status of completion of the requested service; and providing one or more updates on the status of the requested server to the user through an oilfield-related user interface.

12 Claims, 8 Drawing Sheets

(56) References Cited

U.S. PATENT DOCUMENTS

| | | | | |
|---|---|---|---|---|
| 2014/0229698 | A1* | 8/2014 | Sivasubramanian | G06F 12/02 711/170 |
| 2015/0347542 | A1* | 12/2015 | Sullivan | G06F 9/5072 707/602 |
| 2019/0265375 | A1* | 8/2019 | Aqrawi | G01V 1/301 |
| 2020/0265375 | A1* | 8/2020 | Azad | G06Q 10/0639 |
| 2020/0334613 | A1* | 10/2020 | Palazzo | G09B 7/02 |

* cited by examiner

Manage Custom Form Fields

Drag and drop below fields to the form area displayed with dotted lines.

A Text   T Textarea   ≔ Checkbox   ≔ Radio   ≡ Select

Select Country*:
- India
- USA

Required ● Checkbox
Label [Select Country]
Label [India]   Remove
      [USA]    Remove
               Add Name: [Vishvesh]

Required ○ Checkbox
Label [Name]
Placeholder [Enter your name]

Reset   Confirm

OILFIELD DATA LOADING SERVICES REQUEST HANDLING AND COMPLETION SYSTEM

CROSS-REFERENCE TO RELATED APPLICATIONS

This application is a continuation of U.S. patent application Ser. No. 16/948,086, which was filed Sep. 2, 2020, which claims priority to U.S. Provisional Patent Application 62/899,106, which was filed Sep. 11, 2019. Each of the above applications is expressly incorporated herein by reference in its entirety.

BACKGROUND

Exploration and Production (E&P) software platforms are used to collect, analyze, and/or consume data (e.g., petrotechnical data) in an effort to facilitate a variety of tasks (e.g., locating, planning, drilling, and producing hydrocarbons from a well, etc.). Such E&P platforms may be collaborative, providing an environment in which teams of experts in different locations and/or different disciplines can work together to enhance the likelihood of success of a project. Clients may submit requests for data services, such as locating and locating well logs, seismic data, performing simulations, etc.

SUMMARY

In one example aspect, a method for tracking, managing, and fulfilling data loading service request includes: receiving a data loading service request for loading oilfield-related data to an application; generating a service ticket based on the request, the service ticket identifying details of the data loading service request; assigning one or more tasks associated with the service ticket to one or more resources; receiving, from the one or more resources, information regarding status of completion of the requested service; and providing one or more updates on the status of the requested server to the user through an oilfield-related user interface.

In an example aspect, a computing system, includes: one or more processors; and a memory system having one or more non-transitory computer-readable media storing instructions that, when executed by at least one of the one or more processors, cause the computing system to perform operations. The operations include: receiving a data loading service request for loading oilfield-related data to an application; generating a service ticket based on the request, the service ticket identifying details of the data loading service request; assigning one or more tasks associated with the service ticket to one or more resources; receiving, from the one or more resources, information regarding status of completion of the requested service; and providing one or more updates on the status of the requested server to the user through an oilfield-related user interface.

In an example aspect, a non-transitory computer-readable medium storing instructions that, when executed by one or more processors of a computing system, cause the computing system to perform operations. The operations include receiving a data loading service request for loading oilfield-related data to an application; generating a service ticket based on the request, the service ticket identifying details of the data loading service request; assigning one or more tasks associated with the service ticket to one or more resources; receiving, from the one or more resources, information regarding status of completion of the requested service; and providing one or more updates on the status of the requested server to the user through an oilfield-related user interface.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
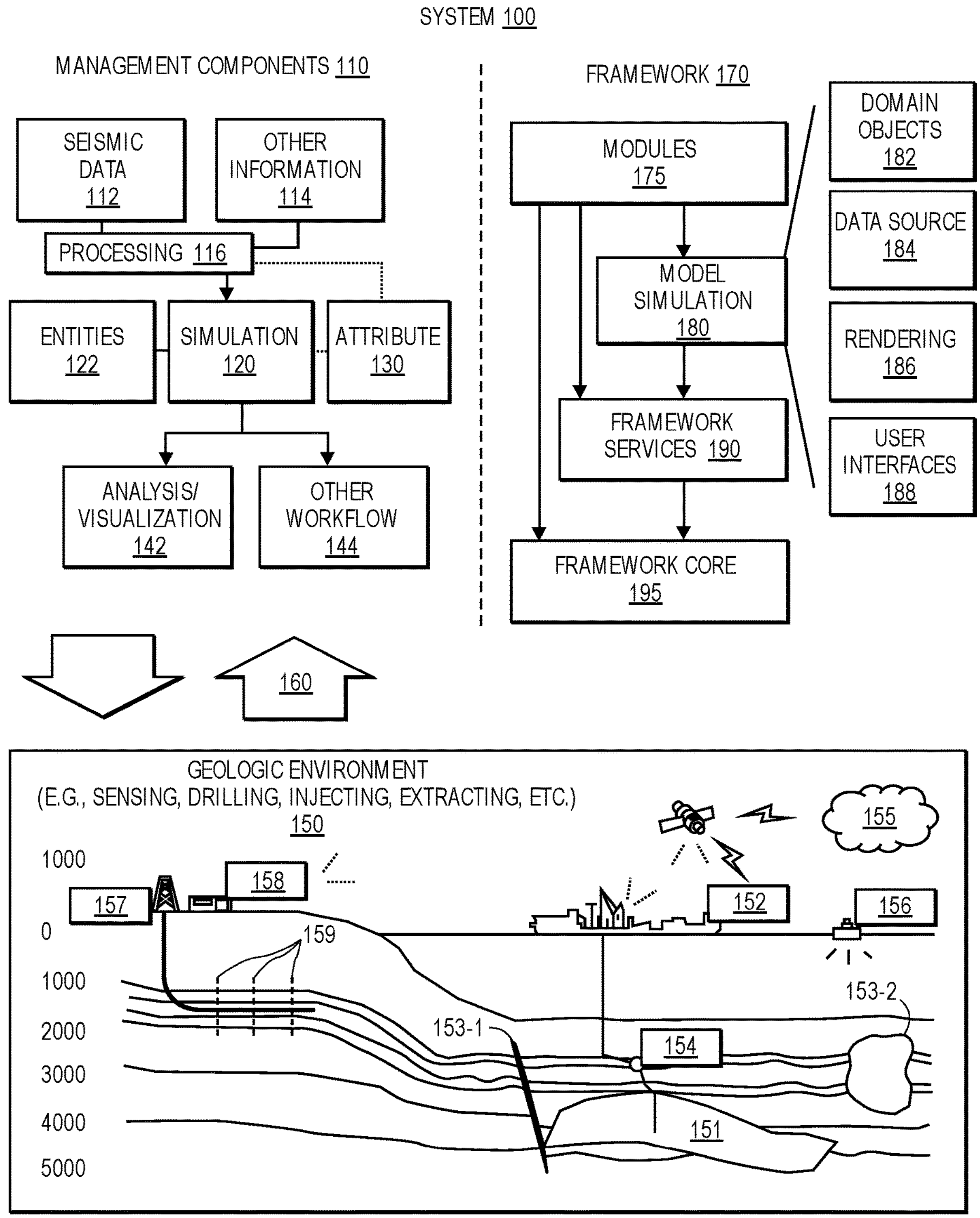
FIG. 1 illustrates an example of a system that includes various management components to manage various aspects of a geologic environment, according to an embodiment.

Exploration and Production (E&P) and/or petrotechnical software platforms may be used to collect, analyze, and/or consume data (e.g., petrotechnical data) in an effort to facilitate a variety of tasks (e.g., locating, planning, drilling, and producing hydrocarbons from a well, etc.). For example, a client may request data to be loaded (e.g., copied, synced, and/or transferred) oilfield-related data from an owner of the data) into a database or other repository for use in an application (e.g., a petrotechnical application). Initiating the request, tracking the progress of the request, and loading the data in accordance with request may involve an extensive level of manual and time-consuming effort, while also being error prone. Further, the sheer volume of available data that may potentially be loaded for use in an application may be difficult to identify for data loading services. For example, existing data loading techniques may involve identifying the physical location of a physical site where data is stored, conducting in-person site visits to submit requests for the data, obtaining the data in physical storage media, and loading the data from the physical storage media to an application. These techniques are not only time consuming, but are also error-prone, as incorrect data may be loaded, and relevant data for an application may be inadvertently omitted.

Accordingly, aspects of the present disclosure may include a cloud-based data loading service system to facilitate the initiation of data loading requests, track the progress of the data loading requests, and accurately execute the data loading request. Further, the techniques described herein may be used to facilitate collaboration between team members (e.g., by providing an interface for team members to comment on data loading requests and progress). As one illustrative example, the data loading service system may be used to facilitate requests to load data into a petrotechnical application (e.g., a request to load 2D seismic data, 3D seismic data, well data, etc.). Additionally, or alternatively, the data loading service system may be used to facilitate requests to load any other type of data into any variety of application. Once data has been loaded into the application, the data may be used by the application to perform a task (e.g., a task relating to oil and gas recovery, exploration, well drilling, etc.).

In some embodiments, a data loading service provider may host a data loading service application for receiving a data loading service request from a user or client. In some embodiments, the data loading service application may present a form (e.g., a Data Management Services Request Form, also referred to herein as a "request form"). In some embodiments, the request form may include a variety of fields, dropdown menus, radio buttons, checkboxes, etc. to receive the parameters of the data loading service request. In some embodiments, the request form may be customized by the data loading services provider. In some embodiments, the request form may be customized for different users/clients. Additionally, or alternatively, the different request forms may be exported/saved and later be imported and used as a start point when generating a new custom request form for a new user or client. In some embodiments, a workflow for completing a data loading service request may be customized for different clients or different request forms used to submit/receive data loading services requests. That is, different request forms may be linked to different users/clients, and different workflows may be linked to different request forms. In this way, each user may be provided with a unique and custom-tailored experience for requesting data based on the user's preferences.

In some embodiments, the data loading service provider may also host a variety of additional services in addition to data loading services. In some embodiments, service requests may be submitted and tracked for these additional services. For example, additional types of services may include application workflow support, application user support, workflow support, training services, tailored workflow generation, application management, application packaging, release management, data management, data quality control, data management governance, data provisioning, data ecosystem ingestion services, petrotechnical infrastructure support, database management, and infrastructure optimization. In some embodiments, the service request may identify the type of service requested.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/of" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET© framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Embodiments of the disclosure may provide a software application (e.g., a computer-readable medium storing computer-executable instructions) for data management services in an E&P software platform, such as DELFI® (commercially-available from Schlumberger Technology Corporation). The data management services application allows users to request services such as 3D or 2D seismic data loading or well data loading, e.g., for petrotechnical suite applications. The data management services application may provide a user interface through which users can request a service from a services team along with the ability to track the service request through its lifecycle. For example, the interface may include a dashboard that is personalized to both service providers and to clients. Thus, the interface dashboard may deliver both an internal or "service provider's" view and an external or "client's" view. The data management application may also be integrated with billing systems, so as to automatically invoice clients for services provided once they are completed.

The external view allows the client to request a service, thereby generating a ticket to be acted upon by the service provider. It also provides the client with tracking information, e.g., in real time on the status of the request through its lifecycle from ticket assignment to resolution. It may also facilitate communication between the service provider and the client, e.g., by allowing the service provider to add comments at any stage to update the client on progress. In a specific embodiment, service requests may be saved in a "My Requests" section of the user interface, thereby providing a record of the user's service requests.

The internal view allows the service provider to assign a ticket (service request) internally and provide the client with tracking information in real time on the status of the request through its full lifecycle from ticket assignment to resolution. In some embodiments, it also allows the service provider to communicate with the client through text messaging within the user interface in real time, thereby updating the client on progress and any other information required. Upon resolution a billing event is created, and the client is automatically billed, e.g., based on the time taken to carry out the service request. Service requests may be saved, e.g., in a "My Tasks" section as a record of the service provider's service requests.

Figure 2:
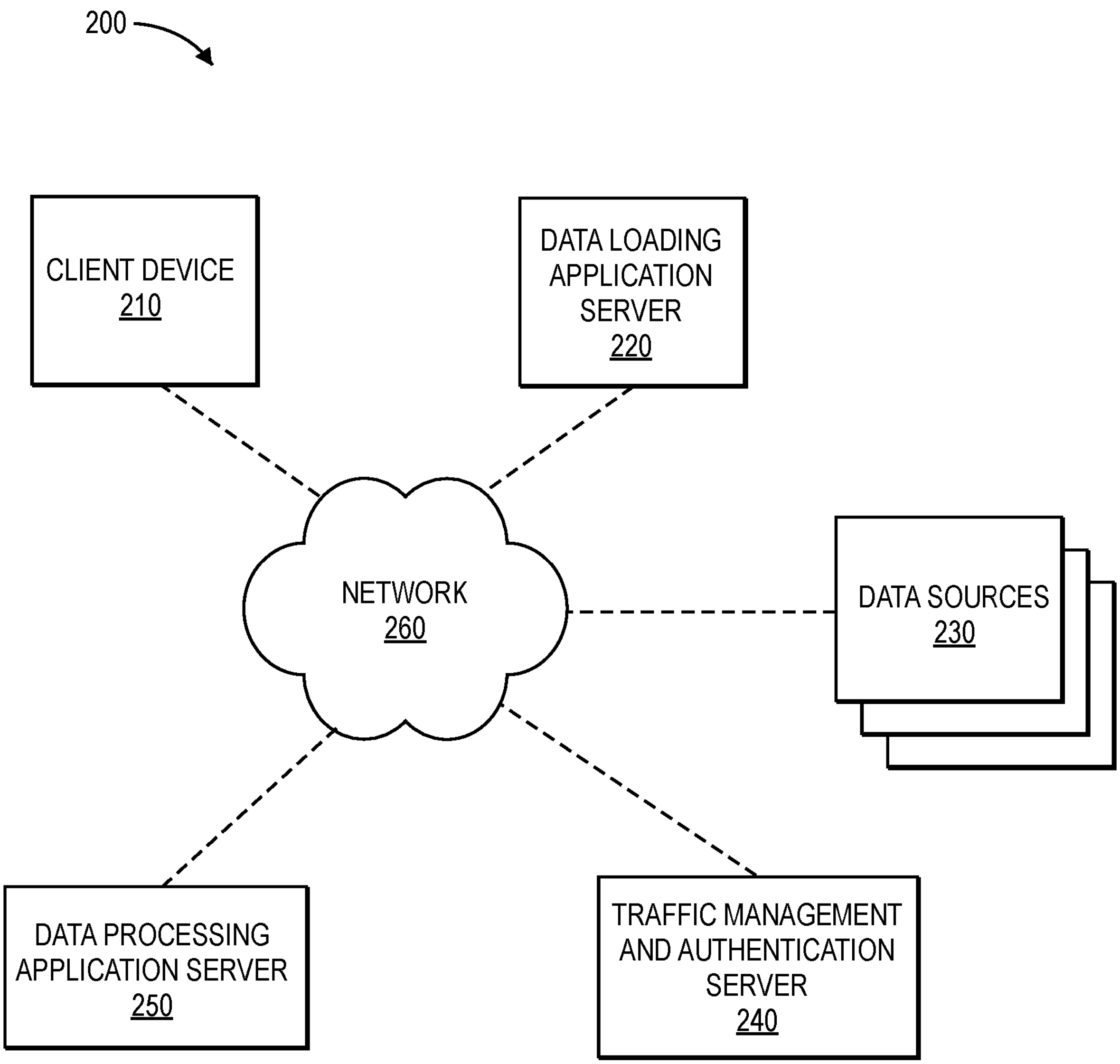
FIG. 2 illustrates an example petrotechnical processing environment according to an embodiment.

FIG. 2 illustrates an example petrotechnical processing environment in accordance with aspects of the present disclosure. As shown in FIG. 2, environment 200 includes a client device 210, a data loading application server 220, data sources 230, a traffic management and authentication server 240, a data processing application server 250, and a network 260.

The client device 210 may include a computing device capable of communicating via a network, such as the network 260. In example embodiments, the client device 210 corresponds to a portable computer device (e.g., a laptop or a tablet computer), a desktop computer, a server computer and/or another type of computing device. In some embodiments, the client device 210 may be used to access a data loading application hosted by the data loading application server 220 to request a data loading service from the data loading application server 220 (e.g., a request to load data from one or more data sources 230 to a database, repository, and/or application). Additionally, or alternatively, the client device 210 may be used to execute an application hosted by the data processing application server 250. In some embodiments, the client device 210 may be used to access the data loading application hosted by the data loading application server 220 to monitor and/or track the progress of data loading requests.

The data loading application server 220 may include one or more computing devices that hosts a data loading application and processes data loading requests received from one or more users (e.g., from the client device 210). In some embodiments, the data loading application server 220 may receive a data loading request (e.g., via a request form presented to the user within the data loading application), including an identification of data to load (e.g., data stored by one or more data sources 230), the location of the identified data, and/or the location where the data should be loaded (e.g., a database, repository, application, etc.). In some embodiments, the data loading application hosted by the data loading application server 220 may receive information tracking the progress of a data loading request (e.g., by a service provider that processes the request) and may publish the progress to the application for viewing by a user associated with the request. As one illustrative example, the data loading application may process a request to load petrotechnical data, such as 2D seismic data, 3D seismic data, well-related data, or the like. In some embodiments, the data loading application may process the request to load the petrotechnical data to a petrotechnical application (e.g., hosted by the data processing application server 250) that uses or consumes the loaded data. In some embodiments, the data loading application server 220 may be used to generate a custom data loading request form and/or a custom workflow for fulfilling/completing a data loading request. The data loading application server 220 may save custom data loading request forms and/or custom workflows, which may be used as templates for generating a new data loading request form and/or custom workflow for a new user/client.

The data sources 230 may include one or more computing devices that stores any variety of types of data (e.g., structured or unstructured data). In some embodiments, the data sources 230 may be available in a cloud or distributed computing environment, and the types of data available may be published such that a user may identify the data that may be available for loading (e.g., by searching and/or filtering by data type, geographic location associated with the data, etc.).

The traffic management and authentication server 240 may include one or more computing devices that manage access requests to the data loading application server 220 (e.g., access requests made by the client device 210 to access the data loading application and initiate data loading requests). For example, the traffic management and authentication server 240 may act as a gatekeeper when the client device 210 access the data loading application server 220. In some embodiments, the traffic management and authentication server 240 may perform any variety of authentication and/or traffic management tasks, such as restricting access to the data loading application server 220 by a restricted client device 210 (e.g., a client device 210 located in a restricted geographic location, a client device 210 from a restricted network, etc.). Additionally, or alternatively, the traffic management and authentication server 240 may perform authentication to permit or restrict the client device 210 from access the data loading application server 220 (e.g., credential verification, certificate verification, hash verification, encryption/decryption-based verification, etc.).

The data processing application server 250 may include one or more computing devices that host an application that may use or consume data loaded from one or more data sources 230. As one illustrative example, the data processing application server 250 may host a petrotechnical application to consume 2D seismic data, 3D seismic data, well-related data, etc. loaded from the data sources 230 as part of a data loading request. Additionally, or alternatively, the data processing application server 250 may host any other variety of application that may consume data loaded from the data sources 230 as part of a data loading request.

The network 260 may include network nodes and one or more wired and/or wireless networks. For example, the network 260 may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 260 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 260 may include copper transmission cables, optical transmission fibers, wireless transmission, routers, firewalls, switches, gateway computers and/or edge servers.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
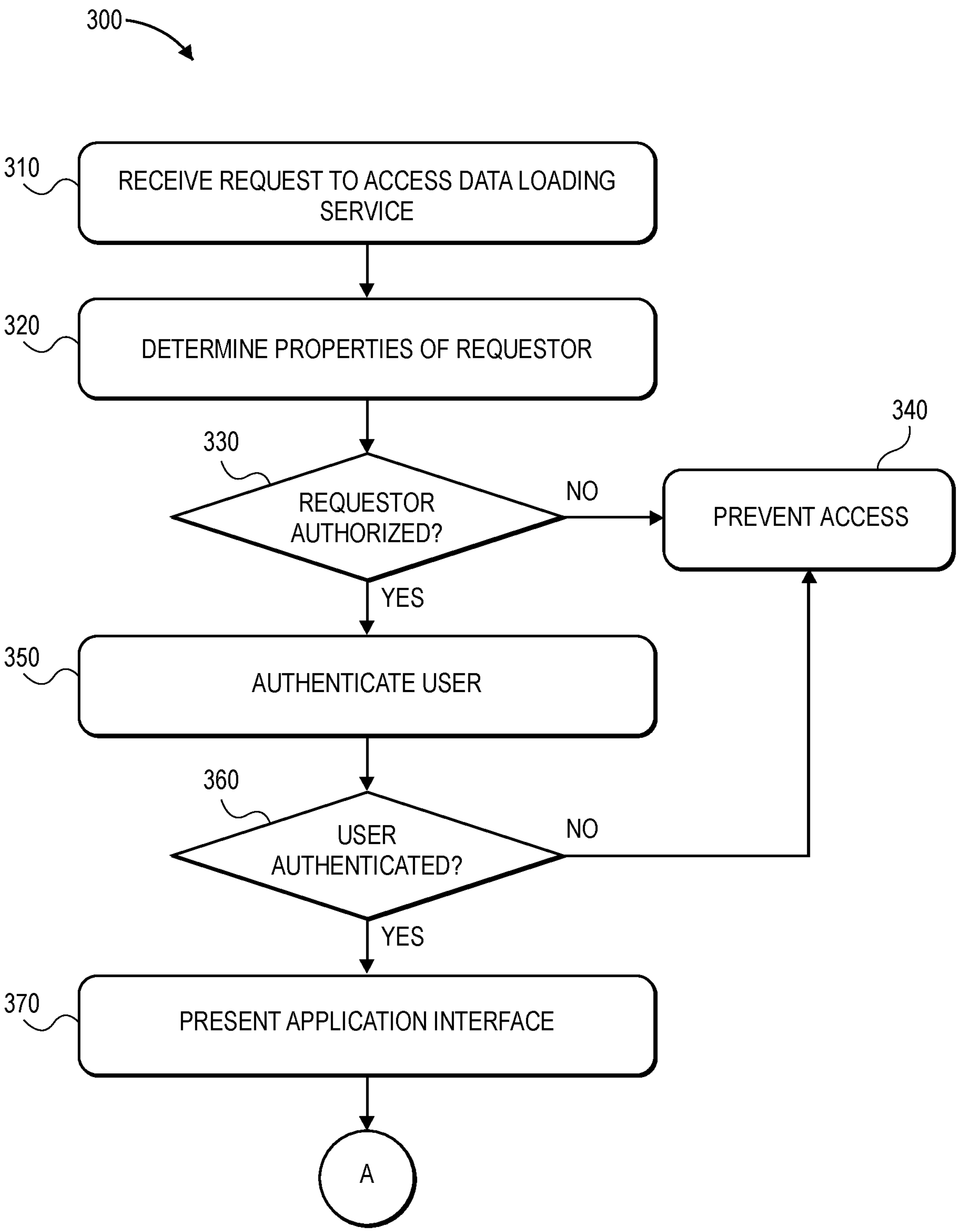
FIG. 3 illustrates a flowchart of a process for processing a request to access a data loading service, according to an embodiment.

FIG. 3 illustrates a flowchart of a process 300 for processing a request to access a data loading service, according to an embodiment. As shown in FIG. 3, the process 300 may include receiving a request to access a data loading service (as at 310). For example, the traffic management and authentication server 240 may receive a request to access a data loading service from the client device 210. In some embodiments, the client device 210 may provide the request via an application or web portal used to submit data loading requests to the data loading application server 220.

The process 300 may further include determining properties of the requestor (as at 320). For example, the traffic management and authentication server 240 may determine properties of the requestor (e.g., the requesting client device 210), such as an IP address, a geographic location, a network location, a device identifier, etc. In some embodiments, the traffic management and authentication server 240 may determine properties of the requestor using an IP address detection application from which a geographic location may be deciphered. Additionally, or alternatively, the traffic management and authentication server 240 may obtain network location information from a network locator service.

The process 300 may also include determining whether the requestor is authorized to access the data loading application server 220 (as at 330). For example, the traffic management and authentication server 240 may determine whether the requesting client device 210 is authorized to access the data loading application server 220 based on the properties of the client device 210 (e.g., determined at 320). In some embodiments, the traffic management and authentication server 240 may use a lookup table having information identifying the properties of authorized requestors and match the properties of the requestor to the lookup table.

If, for example, the requestor is not authorized (as at 330-NO), such as when the client device 210 is from a restricted geographic location, restricted network location, etc., the process 300 may further include preventing access (as at block 340). For example, the traffic management and authentication server 240 may prevent access to the data loading application server 220 by the client device 210 (e.g., by redirecting the client device 210 to another address away from the data loading application server 220, presenting an error message, etc.).

If, on the other hand, the requestor is authorized (as at 330-YES), the process 300 may also include authenticating a user (as at 350). For example, the traffic management and authentication server 240 may authenticate the user of the client device 210 using any variety of authentication techniques (e.g., credential verification, certificate verification, hash verification, encryption/decryption-based verification, etc.).

The process 300 may also include determining whether the user is authenticated (as at 360). For example, the traffic management and authentication server 240 may determine whether the user is authenticated based on performing user authentication (from 350). If, for example, the user is not authenticated (as at 360-NO), the process 300 may return to 340 in which the traffic management and authentication server 240 may prevent access to the data loading application server 220. If, on the other hand, the user is authenticated (as at 360-YES), the process 300 may continue to 370 in which the data loading application server 220 may permit access to the traffic management and authentication server 240 and present a data loading application interface for the user of the client device 210 to initiate a data loading request (as further described in FIG. 4).

Figure 4:
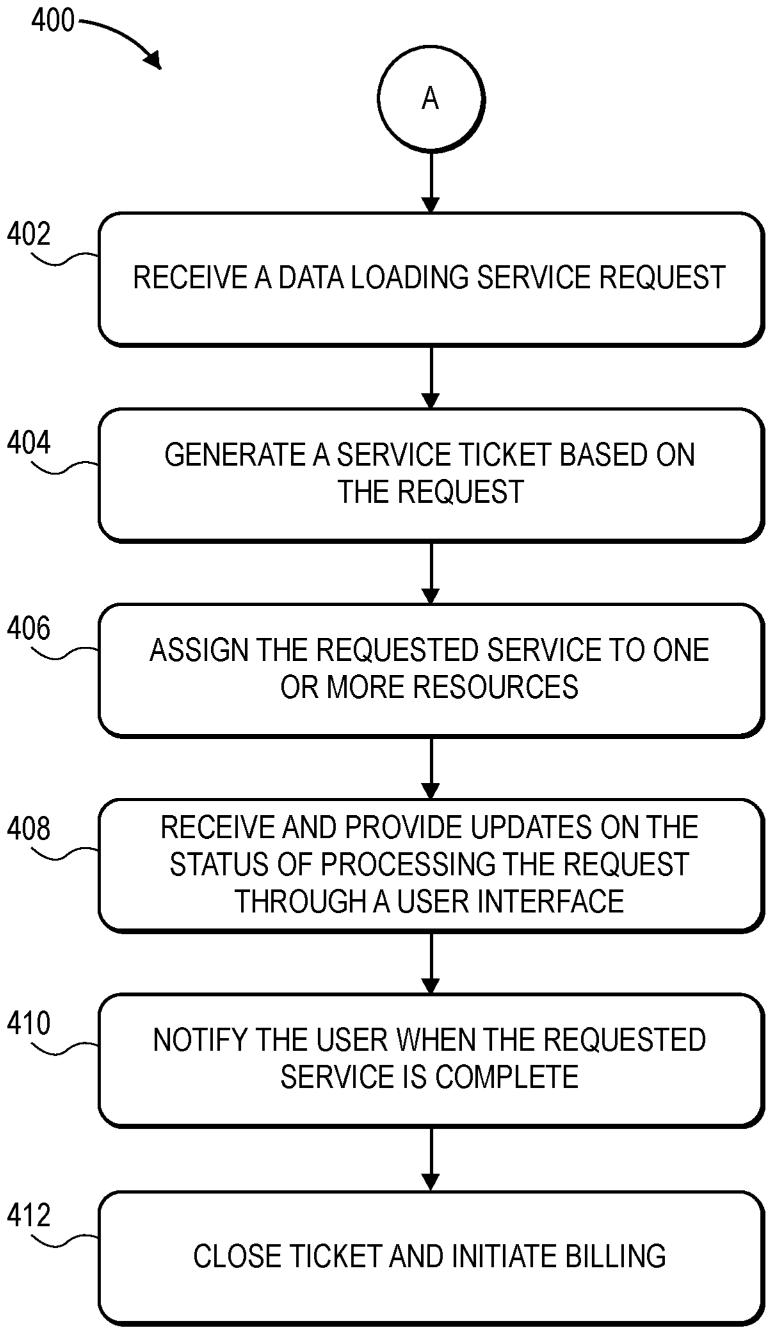
FIG. 4 illustrates a flowchart of a process for processing a data loading services request handling, according to an embodiment.

FIG. 4 illustrates a flowchart of a process 400 for processing a data loading services request handling, according to an embodiment. As shown in FIG. 4, the process 400 may begin at node A which may occur subsequent to the traffic management and authentication server 240 granting access to the data loading application server 220 by the client device 210 and presenting the data loading application interface (e.g., the UI as described above with respect to FIG. 3). The process 400 may include receiving a data loading service request (as at 402). In some embodiments, the request may be submitted by a client/user through a user interface (UI) and using the client device 210 (e.g., using a data loading services application and accessing the data loading application server 220). For example, the user may log into the data loading services application and may be presented with a UI of the application.

In some embodiments, the UI may provide a Data Management Services Request Form. The request form may include fields in which the user may request one or more of data loading services for loading (e.g., copying, syncing, and/or transferring) oilfield-related data (e.g., to an application, a database, a repository, etc.). Oilfield-related data refers to data that represents one or more aspects of an oilfield (e.g., geological data, seismic data, drilling data, production data, etc.). As illustrative, non-limiting examples, the user may use the request form to request 2D seismic data loading, 3D seismic data loading, well data loading, etc. In some embodiments, the data loading request may include information identifying the requested data and the destination of the data (e.g., a database, repository, application, etc.). In some embodiments, the data loading request application may include a search/filter feature in which the user may search for types of data available on the data sources 230 that may be loaded. In some embodiments, the user may specify loading procedures (e.g., loading times, network resource consumption limits, etc.). As described herein, the request form may be customized by the data loading services provider. In some embodiments, the request form and the workflows associated with the different workflows may be customized for different users/clients.

In response to receiving the service request, the process 400 may proceed to generating a service ticket in a ticketing system, as at 404. In some embodiments, the data loading application server 220 may host a service ticketing system in which the data loading application server 220 may generate a ticket representing the data loading service request. In some embodiments, the ticket may identify details of the data loading service request (e.g., an identifier of a client or user that initiated the request, the requested data, the location of the data, and/or the destination of the data, an application type for which the data is to be used, etc.). Additionally, or alternatively, the service ticket may identify a workflow for completing the data loading service request. For example, the data loading application server 220 may store multiple different custom workflows for fulfilling different data loading service requests. Accordingly, the data loading application server 220 may identify a particular custom workflow associated with the data loading service request identified by the service ticket. Further, it will be appreciated that the data loading services application may be integrated with any service management ticketing system. In this way, the ticket may be shared with any variety of stakeholders and the stakeholders may be notified when a ticket is created.

The process 400 may further include assigning the data loading service request to one or more resources (as at 406). For example, the data loading application server 220 may assign the service request to the one or more resources. In some embodiments, a resource may include an operator, a system, and/or automated system. In some embodiments, the data loading application server 220 may select the resource based on the details of the service request and/or information included in the ticket (e.g., an identity of the requesting user/client, the type of data requested for loading, the volume of data requested to be loaded, the application type to receive the data, the workflow associated with the request, etc.). In this way, the data loading service request may be assigned to the best-suited resource(s) having knowledge and/or capabilities of how to best handle and complete the service request (e.g., operators with knowledge, training, and/or experience with the application associated with the request, the client associated with the request, etc.). In some embodiments, any variety of rules and/or criteria may be implemented to determine which operator or group of operators with whom to assign the data loading service request. In some embodiments, the data loading application server 220 may assign the data loading service request to an automated system in addition to, or instead of an operator in which the automated system may process the data loading service request without operator involvement. In some embodiments, the data loading application server 220 may assign the data loading service request based on resource availability, current workload, etc. That is, the data loading application server 220 may perform load balancing when selecting resource(s) to assign the ticket. In this way, the data loading application server 220 may assign the service ticket to one or more resources by matching the resources with the details of the data loading service request identified in the service ticket.

In some embodiments, the data loading application server 220 may provide the assigned resource with information identifying the workflow (e.g., a particular custom workflow) associated with the request such that the assigned resource may fulfill/complete the request in accordance with the identified workflow. As described herein, the workflow for different requests and clients may be customized. In some embodiments, the data loading application server 220 may determine the workflow based on the details of the data loading service request included in the service ticket. For example, the data loading application server 220 may store rules that define workflows based on the details of the data loading service request and/or the type of custom request form that was used to receive the data loading service request.

The process 400 may also include receiving and providing updates on the status of the processing of the request through a user interface (as at 408). For example, the data loading application server 220 may receive information regarding the progress of the processing of the request from a variety of sources, such as operator input indicating the progress, input from an automated system involved in processing the request, etc. In other words, the data loading application server 220 may receive updates as the workflow for completing the data loading services request progresses.

In some embodiments, the updates may be provided at any or all times from assignment to resolution, e.g., (using a GUI tracking dashboard), thereby providing visibility on service status. In some embodiments, the GUI tracking dashboard may present information regarding the progression of workflow stages, milestones, and/or subtasks of the request after the request is submitted by the user. As a non-limiting, illustrative example, the GUI tracking dashboard may present information regarding workflow stages, such as:

New Request: notifying the user that a ticket has been generated against their request;

Assigned: notifying the user that the ticket has been assigned to a service provider operator, (e.g., including the contact information of that operator);

Task Duration: notifying the user of the time the request will take to complete;

Resolved: notifying the user that the request is resolved and the data has been loaded for them;

Close request: requesting that the user now close the request if satisfied with the service;

New events: messages from the service provider operator;

On Hold: if the request is on hold for a particular reason;

Awaiting user response: if the service provider operator requires more information from the user;

Escalated to Third-Party or to Engineering, if appropriate.

In this way the user or requestor of the data loading service may track the progress of their request from the point of request initiation or ticket generation to completion, as the system may continuously provide updates on the status through the user interface.

In some embodiments, the data loading application server 220 may provide an internal dashboard including the status and tracking of tasks that may not be visible to the user, but rather solely to the service provider. For example, the internal dashboard may assist operators in managing and/or completing the service request. In such an internal dashboard, the service provider may assign a ticket to an operator, set the task duration, send communications to the user, set the task status at various stages of the request lifecycle to the statuses previously mentioned, etc.

The process 400 may also include notifying the user when the requested service is complete (as at 410), and closing the ticket and/or initiating billing upon a certain amount of time (or another trigger) after notifying the user that the task is complete (as at 412). In some embodiments, the data loading application server 220 may close the ticket upon completion of all milestones or subtasks associated with the request having been completed. Additionally, or alternatively, a ticket may close automatically after a certain number of days (e.g., five days) in a situation in which the user has not responded to a query or request for additional information. Upon closing of the ticket, the data loading application server 220 may notify the user (e.g., via e-mail, text messaging, through a team collaboration application, etc.). In some embodiments, the data loading application server 220 may notify the user upon completion of each milestone or stage. The data loading application server 220 may further initiate billing upon completion of a ticket in which a bill is generated based on the service requested, the milestones or stages completed, and/or other billing rules, rates, and/or parameters identified in a service level agreement (SLA).

In some embodiments, aspects of the present disclosure may be used to track requests for a variety of oil/gas domain and/or petrotechnical data services. For example, aspects of the present disclosure may be used to track request related to application workflow support, application user support, workflow support, training services, tailored workflow generation, application management, application packaging, release management, data management, data quality control, data management governance, data provisioning, data ecosystem ingestion services, petrotechnical infrastructure support database management, and/or infrastructure optimization.

Figure 5A:
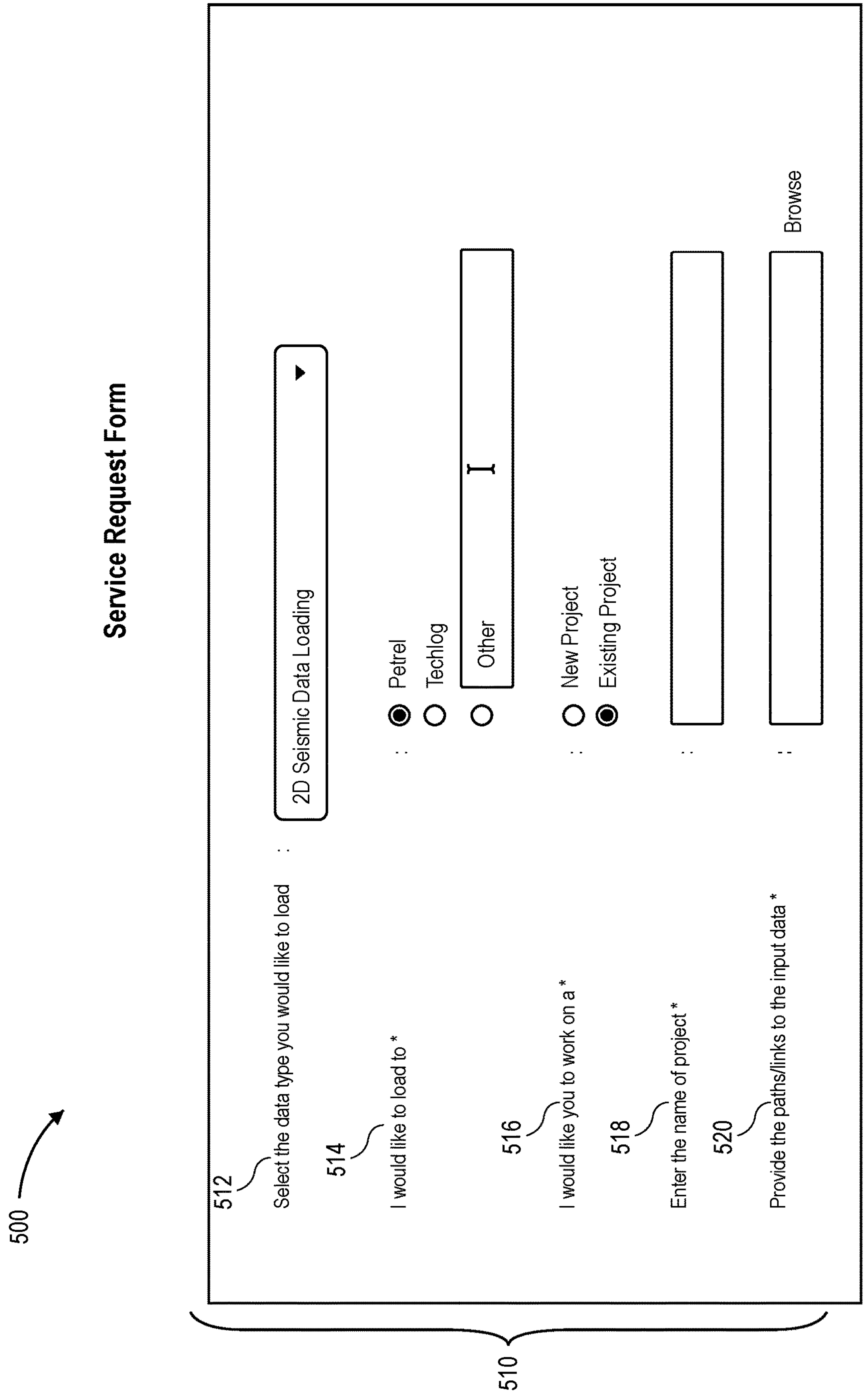
FIG. 5A illustrates an example of request form that may be presented to a user within a UI for submitting a data loading services request.

FIG. 5A illustrates an example of request form that may be presented to a user within a UI for submitting a data loading services request. As shown in FIG. 5A, the request form 500 may include a field area 510 in which a user may provide inputs defining parameters and details of the data loading service request. In the example shown in FIG. 5A, the request form 500 may include a drop-down menu for selecting the type of data to load (e.g., 2D seismic data, 3D seismic data, well-related data, etc.), as at 512. In some embodiments, the request form 500 may further include a set of radio buttons to select an application with which to load the data, as at 514. In some embodiments, the request form 500 may further include a radio button for selecting whether the data is to be loaded to a new project or exiting project, as at 516, and a field to enter a name of the project, as at 518. Additionally, or alternatively, the request form 500 may include a field for selecting a path or link to the input data to be loaded, as at 520. Additionally, or alternatively, the data loading application server 220 may provide a filtering or search tool to search for data to be loaded based on attributes of the data, and information identifying the selected data may be inputted into the request form.

Based on the details inputted into the request form 500, the data loading application server 220 may generate a ticket with the details of the request, identify an appropriate workflow for fulfilling/completing the request, assign the ticket to one or more resources, and track/report the progress of the workflow completion. The example shown in FIG. 5A is provided as an illustrative example. In practice, the request form may differ than what is shown in FIG. 5A. Further, as described herein, the request form may be customized for different users and clients using a custom form generator.

Figure 5B:
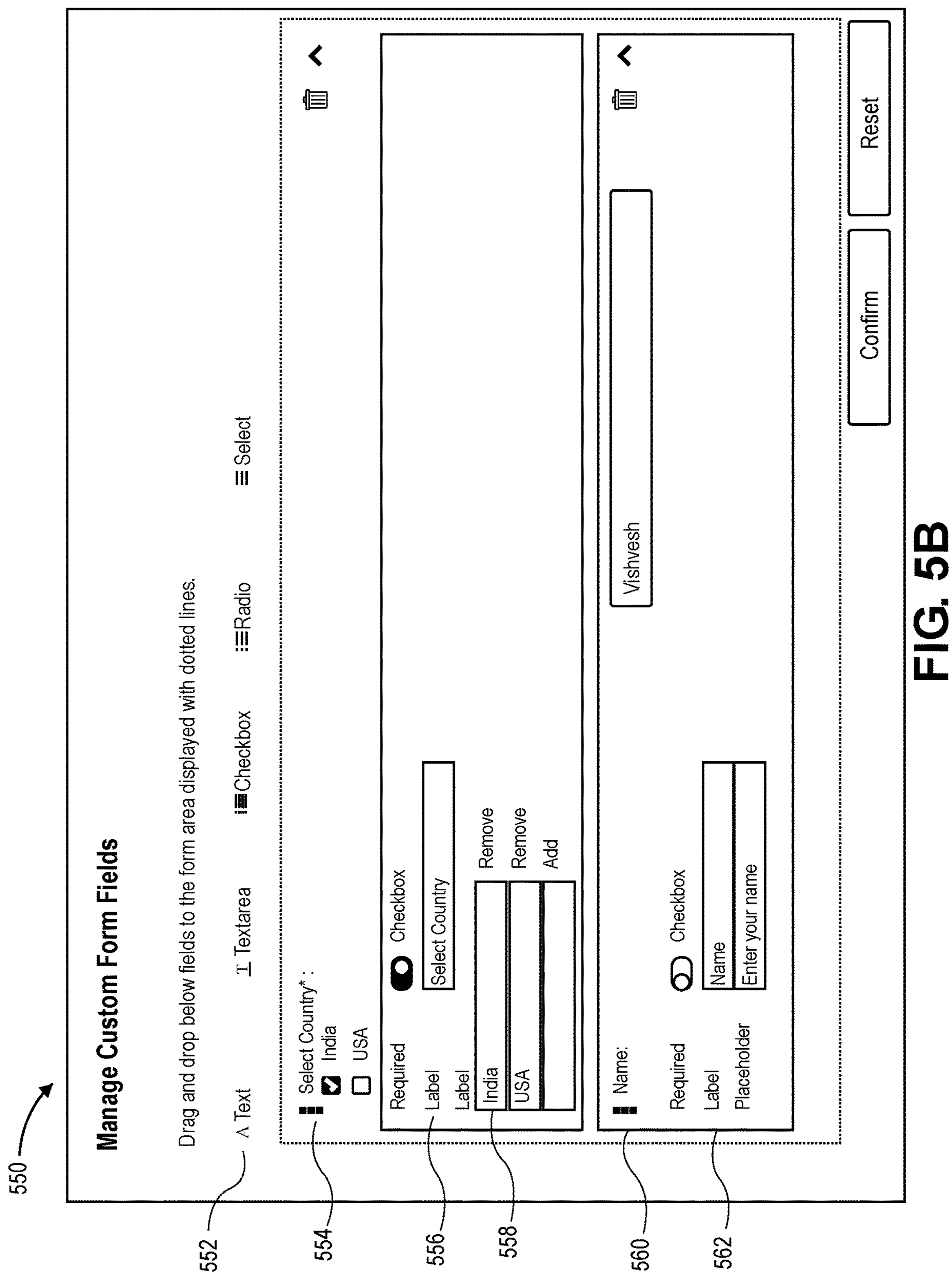
FIG. 5B illustrates an example custom form generator for generating a form that may be presented to a user for receiving a data loading service request.

FIG. 5B illustrates an example custom form generator for generating a form that may be presented to a user for receiving a data loading service request. For example, as described herein, different forms may be used to receive data loading service request from different users whose data loading needs may differ (e.g., based on the nature of their industry, applications used with loaded data, etc.). As shown in FIG. 5B, a custom form generator 550 may include an objects area in which a user may select a variety of objects to include the custom form, as at 552. In some embodiments, the objects may include a text box, a text area, a checkbox, a radio button, a selection option, etc. In some embodiments, an object may be dragged and dropped to the custom form. As one example, the checkbox object may be dragged and dropped, as at 554. The label of the checkbox title may be inputted, as at 556 (e.g., "Select Country", and the labels of each checkbox may be inputted, as at 558 (e.g., "India," and "USA"). As further shown in the example of FIG. 5B, a text area may be dragged and dropped to the form, as at 560. The label of the text area may be inputted, as at 562 (e.g., "Name"). In this example, the custom form may include a field for the user to entire a name associated with the request. As described herein, the custom form may include any variety of fields, textboxes, radio buttons, checkboxes, etc. for the purposes of generating a custom request form for a particular client or group of clients so that different information may be inputted into the request forms for different clients/users. Further, the custom forms may be saved and used as templates (e.g., used as-is, or as a basis for generating a different custom form).

Figure 6:
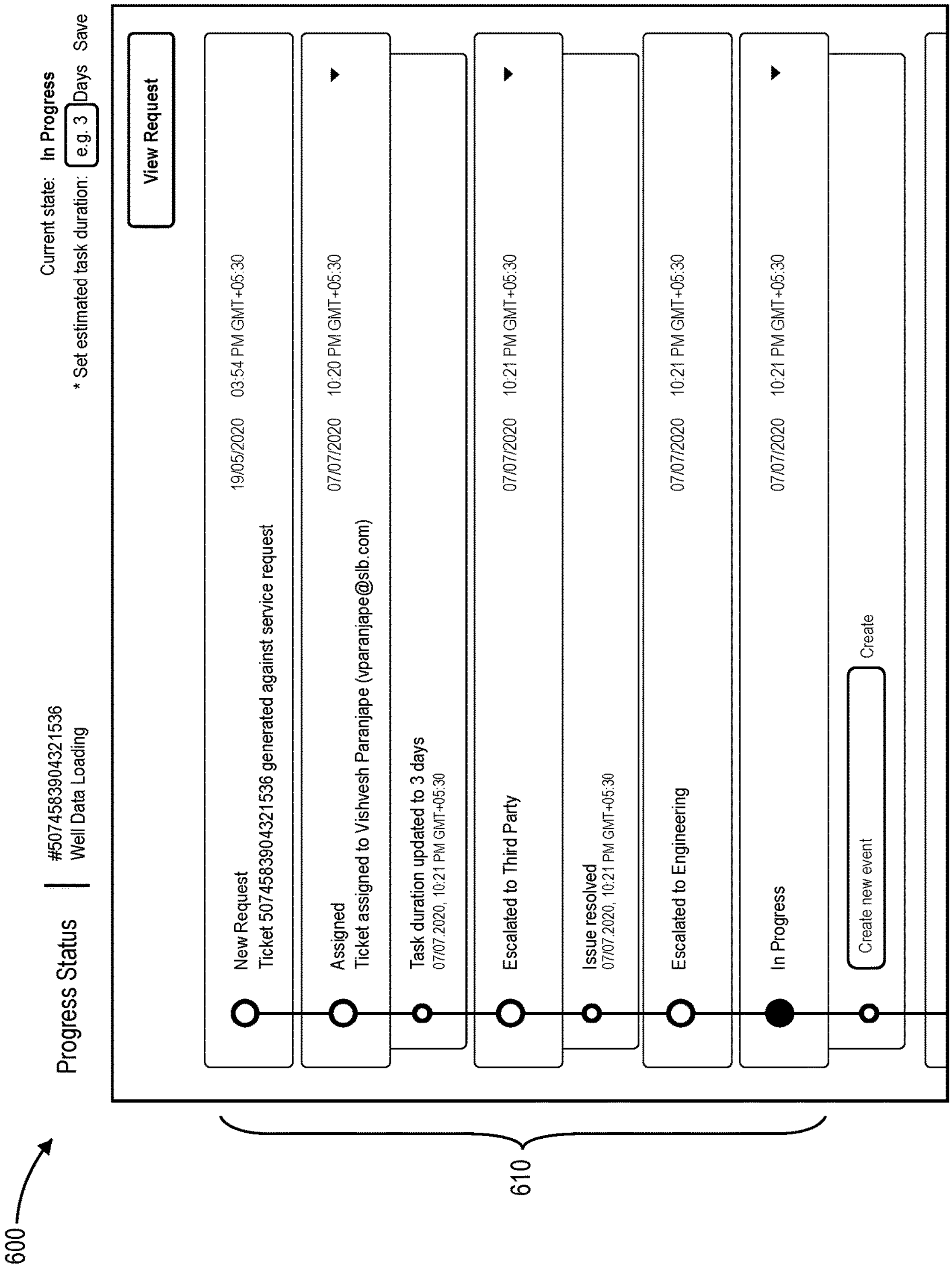
FIG. 6 illustrates an example GUI tracking dashboard identifying the progress of workflow for completing a data loading service request.

FIG. 6 illustrates an example GUI tracking dashboard identifying the progress of workflow for completing a data loading service request. As shown in FIG. 6, the GUI tracking dashboard 600 may present the progression status of a ticket corresponding to a workflow for the data loading service request (e.g., a request to load well data from a data source 230 to an application). The GUI tracking dashboard 600 may include a tracking area 610 in which each workflow stage or milestone of the ticket is presented, along with status of each stage. Each stage may be timestamped and described with a narrative. In this way, the user may easily view the status of their data loading service request ticket without the need for extensive physical site visits, service calls, etc. Further, the user may comment on various stages of the ticket to communicate with the operator and/or other team members involved with the ticket. As described herein, the workflow for completing the request may be customized and thus, in practice, the workflow may appear different than the example shown in FIG. 6.

Figure 7:
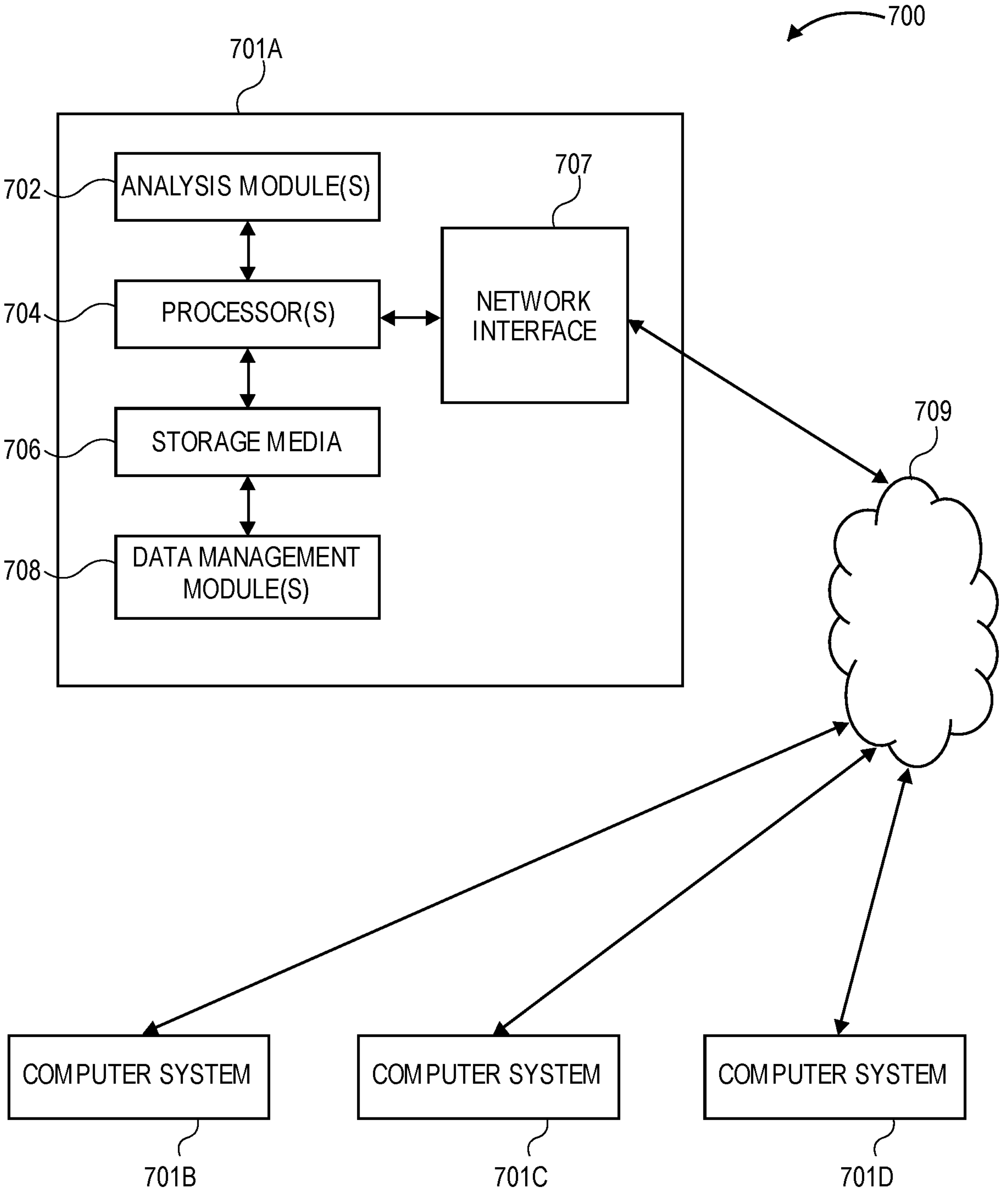
FIG. 7 illustrates a schematic view of a computing system, according to an embodiment.

In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 700 contains one or more data management module(s) 708. In the example of computing system 700, computer system 701A includes the data management module 708. In some embodiments, a single data management module may be used to perform some aspects of one or more embodiments of the methods disclosed herein. In other embodiments, a plurality of data management modules may be used to perform some aspects of methods herein.

It should be appreciated that computing system 700 is merely one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method comprising:
receiving a data loading service request for loading data to an application;
generating a service ticket in response to the request, the service ticket identifying details of the data loading service request;
assigning one or more tasks associated with the service ticket to one or more resources comprising one or more automated systems and one or more operators, wherein assigning the one or more tasks comprises selecting the one or more resources based on information included in the service ticket, wherein the information comprises an identity of a user requesting the data loading service request, a type of data associated with the data loading service request, a volume of the data to be loaded, and an application type to receive the data;
receiving, from the one or more resources, additional information regarding a status of completion of the data loading service request after the one or more tasks are assigned to the one or more resources, wherein the additional information comprises a new request, a request assigned, a request resolved, a close request, or any combination thereof; and
providing one or more updates of the status of the requested service to the user through a user interface.

2. The method of claim 1, wherein the one or more resources are selected based on:
one or more availability schedules of the one or more operators;
one or more training profiles of the one or more operators with respect to the application type; and
one or more capabilities of the one or more automated systems to complete the data loading service request with respect to the type of data and the volume of the data.

3. The method of claim 1, wherein the data loading service request is received from the user via a custom form presented in the user interface.

4. The method of claim 3, further comprising:
saving the custom form; and
generating another custom form for a different user using the saved custom form.

5. The method of claim 1, wherein the details of the data loading service request include a type of service or a type of service request,
wherein the type of data includes at least one selected from the group consisting of:
2D seismic data;
3D seismic data; and
well-related data, and
wherein the type of service includes at least one selected from the group consisting of:
application workflow support;
application user support;
workflow support;
training services;
tailored workflow generation;
application management;
application packaging;
release management;
data management;
data quality control;
data management governance;
data provisioning;
data ecosystem ingestion services;
petrotechnical infrastructure support;
database management; and
infrastructure optimization.

6. The method of claim 1, further comprising identifying a custom workflow, of a plurality of saved custom workflows, associated with the service ticket, wherein assigning the one or more tasks is based on the identifying the custom workflow.

7. A computing system, comprising:
one or more processors; and
a memory system comprising one or more non-transitory computer-readable media storing instructions that, when executed by at least one of the one or more processors, cause the computing system to perform operations, the operations comprising:
receiving a data loading service request for loading data to an application;
generating a service ticket in response to the request, the service ticket identifying details of the data loading service request;
assigning one or more tasks associated with the service ticket to one or more resources comprising one or more automated systems and one or more operators, wherein assigning the one or more tasks comprises selecting the one or more resources based on information included in the service ticket, wherein the information comprises an identity of a user requesting the data loading service request, a type of data associated with the data loading service request, a volume of the data to be loaded, and an application type to receive the data;
receiving, from the one or more resources, additional information regarding a status of completion of the data loading service request after the one or more tasks are assigned to the one or more resources, wherein the additional information comprises a new request, a request assigned, a request resolved, a close request, or any combination thereof; and
providing one or more updates of the status of the requested service to the user through a user interface.

8. The system of claim 7, wherein the one or more resources are selected based on:
one or more availability schedules of the one or more operators;
one or more training profiles of the one or more operators with respect to the application type; and
one or more capabilities of the one or more automated systems to complete the data loading service request with respect to the type of data and the volume of the data.

9. The system of claim 7, wherein the data loading service request is received from the user via a custom form presented in the user interface.

10. The system of claim 9, wherein the operations further comprise:
saving the custom form; and
generating another custom form for a different user using the saved custom form.

11. The system of claim 7, wherein the details of the data loading service request include a type of service or a type of service request,
wherein the type of data includes at least one selected from the group consisting of:
2D seismic data;
3D seismic data; and
well-related data, wherein the type of service includes at least one selected from the group consisting of:
- application workflow support;
- application user support;
- workflow support;
- training services;
- tailored workflow generation;
- application management;
- application packaging;
- release management;
- data management;
- data quality control;
- data management governance;
- data provisioning;
- data ecosystem ingestion services;
- petrotechnical infrastructure support;
- database management; and
- infrastructure optimization.

12. The system of claim 7, further comprising identifying a custom workflow, of a plurality of saved custom workflows, associated with the service ticket, wherein assigning the one or more tasks is based on the identifying the custom workflow.

* * * * *